US011718123B2

(12) United States Patent
Johnson et al.

(10) Patent No.: US 11,718,123 B2
(45) Date of Patent: Aug. 8, 2023

(54) LASER TEXTURED IDENTIFICATION DOCUMENT SURFACES

(71) Applicant: Entrust Corporation, Shakopee, MN (US)

(72) Inventors: Peter Johnson, Shakopee, MN (US); Tom Stebbing, Shakopee, MN (US); Rohit Agarwala, Shakopee, MN (US); Brian Hagen, Shakopee, MN (US); Andrew Mettke, Shakopee, MN (US)

(73) Assignee: Entrust Corporation, Shakopee, MN (US)

( * ) Notice: Subject to any disclaimer, the term of this patent is extended or adjusted under 35 U.S.C. 154(b) by 0 days.

(21) Appl. No.: 17/224,444

(22) Filed: Apr. 7, 2021

(65) Prior Publication Data

US 2021/0309041 A1 Oct. 7, 2021

Related U.S. Application Data

(60) Provisional application No. 63/006,289, filed on Apr. 7, 2020.

(51) Int. Cl.
*B42D 25/41* (2014.01)
*B42D 25/24* (2014.01)
(Continued)

(52) U.S. Cl.
CPC ............. *B42D 25/41* (2014.10); *B42D 25/24* (2014.10); *B42D 25/309* (2014.10); *B42D 25/324* (2014.10)

(58) Field of Classification Search
CPC ...... B42D 25/41; B42D 25/309; B42D 25/24; B42D 25/324
(Continued)

(56) References Cited

U.S. PATENT DOCUMENTS 4,825,054 A 4/1989 Rust et al.
4,995,501 A 2/1991 Lundstrom et al.
(Continued)

FOREIGN PATENT DOCUMENTS

KR 10-2016-0070141 A 6/2016
WO WO-2018164574 A1 * 9/2018 ............. B42D 25/23
(Continued)

OTHER PUBLICATIONS

International Search Report and Written Opinion, International Patent Application No. PCT/IB2021/052903, dated Jul. 15, 2021 (13 pages).

(Continued)

*Primary Examiner* — Justin V Lewis
(74) *Attorney, Agent, or Firm* — Hamre, Schumann, Mueller & Larson, P.C.

(57) ABSTRACT

Security features used on identification documents such as plastic cards and passport pages are described. The security features include a textured portion that is formed on a portion of the surface of the identification document using a laser. The security features can also include a printed portion and/or a laser marked portion. The printed portion (if present) can be formed above or beneath the textured portion. The laser marked portion (if present) is formed within the thickness of the identification document below the textured portion. The textured portion and the printed portion and/or the laser marked portion can be in congruence with one another to form the security feature.

24 Claims, 5 Drawing Sheets

(51) Int. Cl.

| | |
|---|---|
| ***B42D 25/309*** | (2014.01) |
| ***B42D 25/324*** | (2014.01) |
| ***B42D 25/435*** | (2014.01) |
| ***B42D 25/23*** | (2014.01) |

(58) Field of Classification Search
USPC ....... 283/67, 70, 72, 74, 75, 77, 94, 98, 901
See application file for complete search history.

(56) References Cited

U.S. PATENT DOCUMENTS

| | | | | |
|---|---|---|---|---|
| 5,266,781 | A | 11/1993 | Warwick et al. | |
| 5,837,991 | A | 11/1998 | LaManna et al. | |
| 6,131,817 | A | 10/2000 | Miller | |
| 6,783,067 | B2 | 8/2004 | Kreuter et al. | |
| 6,902,107 | B2 | 6/2005 | Shay et al. | |
| 7,398,972 | B2 | 7/2008 | Schuller et al. | |
| 7,434,728 | B2 | 10/2008 | Paulson et al. | |
| 11,052,697 | B2 | 7/2021 | Van Dijk et al. | |
| 2007/0187870 | A1 | 8/2007 | Lundstrom et al. | |
| 2009/0295851 | A1* | 12/2009 | Edwards .............. | B41M 5/0023 283/117 |
| 2012/0212594 | A1* | 8/2012 | Barnes ................... | G06V 10/20 348/E7.085 |
| 2017/0050459 | A1 | 2/2017 | Tiguy et al. | |
| 2017/0294031 | A1* | 10/2017 | Wu ........................ | B42D 25/00 |
| 2018/0333977 | A1 | 11/2018 | Van Den Berg | |
| 2020/0009896 | A1 | 1/2020 | Godfrey et al. | |
| 2020/0307299 | A1* | 10/2020 | Van Dijk ............... | B42D 25/41 |

FOREIGN PATENT DOCUMENTS

| | | | |
|---|---|---|---|
| WO | 2020/015847 | A1 | 1/2020 |
| WO | 2020/015848 | A1 | 1/2020 |
| WO | 2020/047650 | A1 | 3/2020 |

OTHER PUBLICATIONS

Olson, Mary "The Future is Now Power of Integrating PKI and Personalization", ICAO, 2016 (21 pages).

Veridos GmbH, "Clip ID Vivid color images for innovative ID", Verido Identity Solutions by Glesecke + Devrient and Bundesdruckerei, 2018 (2 pages).

* cited by examiner

LASER TEXTURED IDENTIFICATION DOCUMENT SURFACES

FIELD

This technical disclosure relates to security features on identification documents such as plastic cards and passport pages and the creation of the security features.

BACKGROUND

Identification documents such as identification cards, credit and debit cards, driver's licenses, and the like, and passports, are personalized with information concerning the intended holder of the identification document and then issued to the intended holder. Personalization and issuance are typically handled by government agencies, credit card companies, or other entities authorized to handle the personalization and issuance process. As part of the personalization and issuance process, the identification documents can undergo a number of processing procedures, including printing, portrait printing, magnetic stripe encoding, integrated circuit chip programming, embossing, lamination of protective laminates, and other known procedures.

A number of security measures have been implemented in order to resist counterfeiting, forgery or tampering with identification documents. Further improvements to security measures to resist counterfeiting, forgery or tampering with identification documents, as well as resist fraudulent use of identification documents once issued, are needed

SUMMARY

A number of security features used on identification documents such as plastic cards and passport pages are described herein. The security features include a textured surface that is formed on a portion of the identification document using a laser.

In one embodiment of the security features described herein, a laser is used to create a texture on a portion of an outermost surface of the plastic card or passport page. The texture that is created is visible to the naked eye and is tactile. In one embodiment, the textured portion of the surface can overlay another security feature that is formed within the card or passport page underlying the textured portion. In another embodiment, the textured portion of the surface may be integrated directly with another security feature, such as a printed security feature. In another embodiment, the textured portion may both overlie a first security feature and be integrated directly into a second security feature. The textured portion can be generated before or after the other security feature is generated.

In an embodiment, the textured portion can be created so as to be congruent with, registered to, and/or coordinated with, a security feature underlying the textured portion and/or a security feature that overlays the textured portion and/or a security feature that is integrated directly with the textured portion. For example, the textured portion can be an image of the intended holder of the identification document and can be created in congruence or registration with another image of the intended holder of the identification document that is created under or over the textured portion.

Plastic cards described herein include, but are not limited to, financial (e.g., credit, debit, or the like) cards, access cards, driver's licenses, national identification cards, business identification cards, gift cards, and other plastic cards that can benefit from having one or more security features described herein added to the plastic card. The passport pages can be a front cover or a rear cover of the passport, or an internal page (for example a plastic page or a paper page) of the passport.

DRAWINGS

DETAILED DESCRIPTION

Figure 1:
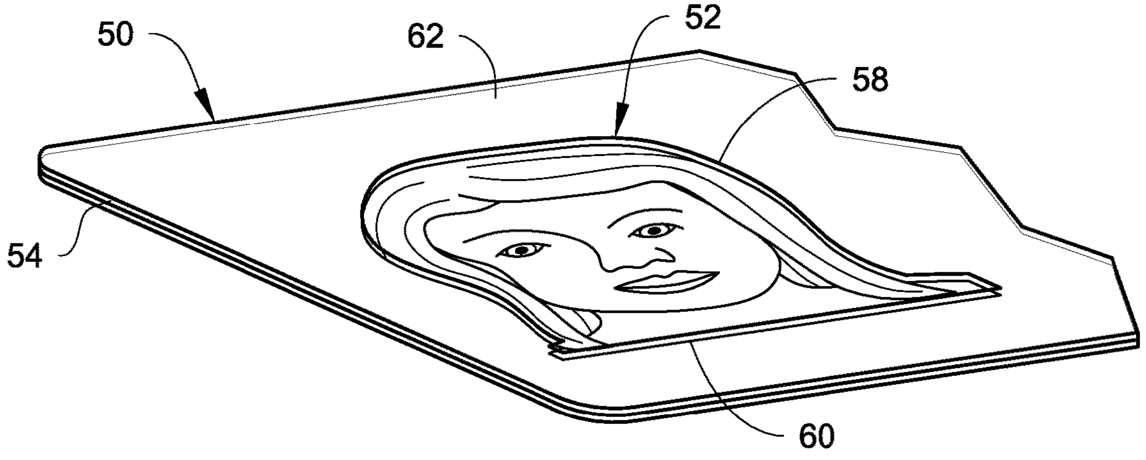
FIG. 1 depicts a portion of an identification document in the form of a plastic identification card having a laser textured surface, a printed image, and a laser marked image.

Identification documents are described that include a security feature formed by a textured surface that is created on a portion of the identification document using a laser. The textured surface is visible to the naked eye and in some embodiments may be tactile. In some embodiments, the textured surface may form an outermost surface of the identification document. In other embodiments, some or all of the textured surface may be covered by a subsequently applied layer, for example an optional transparent or translucent coating material or even by a layer of printed ink. A number of embodiments of security features on identification documents are described herein, each of which utilizes the textured surface that is created by a laser, for example during personalization of the identification document.

Identification documents encompassed herein include plastic cards and passport pages of passports. Plastic cards described herein include, but are not limited to, financial (e.g., credit, debit, or the like) cards, access cards, driver's licenses, national identification cards, business identification cards, gift cards, and other plastic cards that can benefit from having one or more security features described herein added to the plastic card. The plastic cards may also be referred to as plastic identification cards. The passport pages can be a front cover or a rear cover of the passport, or an internal page (for example a plastic page or a paper page) of the passport. The techniques described herein can also be used on paper documents as well.

Many variations of the security features with a textured surface are possible. In one embodiment, the textured portion of the surface can overlay another security feature that is formed within the card or passport page underlying the textured portion. In another embodiment, the textured portion of the surface may be integrated directly with another security feature, such as a printed security feature. In another embodiment, the textured portion may both overlie a first security feature and be integrated directly into a second security feature. The textured portion can be generated before or after another security feature is generated.

For sake of convenience in describing the concepts herein, the following description and the drawings disclose the identification document as being a plastic card. However, as indicated above, the techniques described herein are applicable to pages of passports on which a security feature can be formed.

The term "plastic cards" as used throughout the specification and claims, unless indicated otherwise, refers to cards where the card substrate can be formed entirely of plastic, formed of a combination of plastic and non-plastic material, or formed mostly or completely of non-plastic materials. In one embodiment, the cards can be sized to comply with ISO/IEC 7810 with dimensions of about 85.60 by about 53.98 millimeters (about 3⅜ in×about 2⅛ in) and rounded corners with a radius of about 2.88-3.48 mm (about ⅛ in). As would be understood by a person of ordinary skill in the art of plastic identification cards, the cards are typically formed of multiple individual layers that form the majority of card body or card substrate. Examples of plastic materials that the card or the individual layers of the card can be formed from include, but are not limited to, polycarbonate, polyvinyl chloride (PVC), polyester, acrylonitrile butadiene styrene (ABS), polyethylene terephthalate glycol (PETG), TESLIN®, combinations thereof, and other plastics.

As used herein, the term "processing" (or the like) as used throughout the specification and claims, unless indicated otherwise, is intended to encompass operations performed on a card that includes operations that result in personalizing the card as well as operations that do not result in personalizing the card. An example of a processing operation that personalizes the card is creating the cardholders image or name on the card. An example of a processing operation that does not personalize the card is applying a laminate to the card or printing non-cardholder graphics on the card. The term "personalize" is often used in the card industry to refer to cards that undergo both personalization processing operations and non-personalization processing operations.

The language "congruent", "registered", "aligned", "coordinated with", and "combine to form a security feature" (or the like) as used throughout the specification and claims, unless indicated otherwise, is intended to refer to a congruence between two or more of the features described herein, for example between two or more of the textured portion, the printed portion, and the laser marked portion described below. These terms are different than and distinct from two security features, for example two images of a card holder, that may only partially overlap one another or where one security feature has a size that is significantly less than the other whereby the two security features are not congruent with one another.

FIG. 1 illustrates a portion of a plastic card 50 that includes an example of a security feature 52 as described herein. The plastic card 50 can be of generally standard construction (except for the security feature 52). The plastic card 50 can be formed from a plurality of individual layers that are layered upon one another to form the card body or card substrate 54. The card 50 can include other features known in the art including, but not limited to, an integrated circuit chip, a magnetic stripe, and personalized data such as the name of the intended card holder, an address of the card holder, an account number or other unique identification number assigned to the cardholder, a card verification value number, and the like. The card 50 can further include non-personalized data or features including, but limited to, printed graphics, a logo of the card issuer, a bank name, and the like.

In the example in FIG. 1, the security feature 52 includes a textured portion 56 (best seen in FIGS. 2-7), an optional printed portion 58 (best seen in FIGS. 1 and 3-7), and/or an optional underlying portion 60 (best seen in FIGS. 1 and 3-7). In some embodiments, the textured portion is formed on an outermost surface 62 of the card 50 by a suitable laser which creates the texture on the surface 62 by ablating/displacing/melting the card material thereby creating physical modifications to the surface 62 to form the textured portions 56. The textured portion 56 may be visible to the naked eye and in some embodiments is tactile. The textured portion 56 can be congruent with (i.e. registered, aligned, or coordinated with) the optional printed image 58. In addition, the textured portion 56 can be congruent with (i.e. registered, aligned, or coordinated with) the optional underlying portion 60. The underlying portion 60 can be a laser marked portion or a pre-printed portion such as a lithography printed portion that could reside in a similar location as a laser marked portion. In some embodiments, both a laser marked portion and a pre-printed portion could be used. To facilitate the following description, the underlying portion 60 will hereinafter be described as being a laser marked portion. However, the underlying portion can be formed by techniques other than laser marking or by a combination of laser marking and printing techniques.

Figure 2:
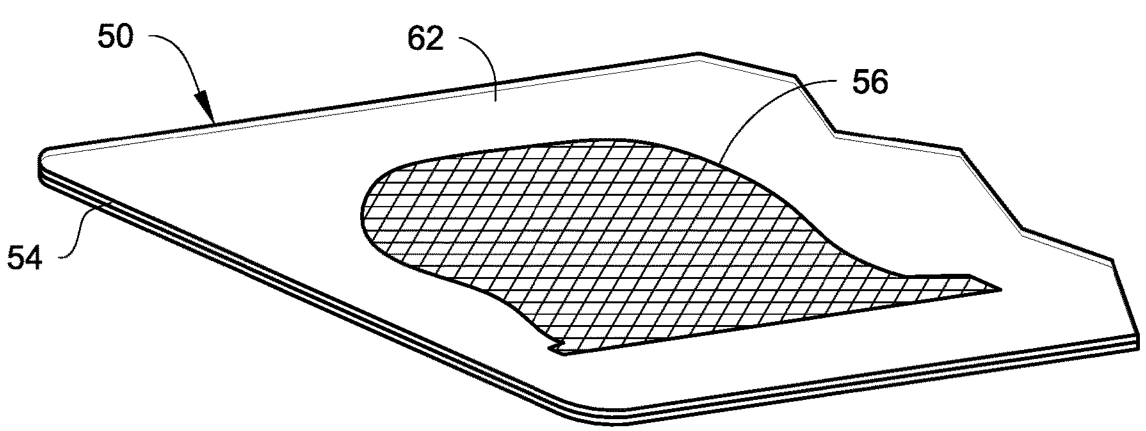
FIG. 2 depicts the laser textured surface of FIG. 1.

Each of the textured portion 56, the printed portion 58, and the laser marked portion 60 can be related to personalized data of the intended card holder. For example, as depicted in FIGS. 1-2, each of the textured portion 56, the printed portion 58, and the laser marked portion 60 are a complete or partial image of the intended cardholder. However, the textured portion 56, the printed portion 58, and the laser marked portion 60 can form other personalization data including alpha-numeric text associated with the intended cardholder. The textured portion 56, the printed portion 58, and the laser marked portion 60 are formed so as to identically overlap one another as precisely as possible so that they are in congruence with each other.

The textured portion 56 need not form an exact replica of the personalized data. For example, as depicted in FIG. 2, the textured portion 56 forms an outline of the cardholder image, with facial features of the cardholder not visible in the textured portion 56. In other embodiments, the textured portion 56 can form a redundant copy of the cardholder image or alpha-numeric text, a negative copy of the image of the cardholder image, a subset of pixels from the cardholder image, an outline of the cardholder image, text in a pattern throughout the cardholder image and/or around the cardholder image, patterns throughout the cardholder image and/or around the cardholder image, and other textures.

In other embodiments, the textured portion 56, the printed portion 58, and the laser marked portion 60 relate to data associated with the plastic card 50 such as a card number or associated with the issuer of the card 50 such as an issuing government (country, state, regional, etc.), country code, a flag, a symbol, issuer name or logo (for example VISA, MASTERCARD, etc.) or a bank name or logo.

The textured portion 56 can be formed on the surface 62 using a $CO_2$ laser or another suitable laser that produces a normally optically clear but textured image of personalized or other data on the surface 62. The surface 62 is ablated/displaced/melted or otherwise modified by the laser energy absorbed by the surface material. In some embodiments, the textured portion 56 can be applied independently as a secondary security feature separate from other security features. However, in other embodiments, the textured portion 56 forms an additional visible security feature that is integrated with the primary personalized printed image portion 58 of the document holder. The textured portion 56 can be applied before or after the primary image portion 58. The textured portion 56 can be registered to, and/or coordinated with, the primary personalized printed image portion 58 and/or with the laser marked portion 60.

The textured portion 56 can be generated using standard digitizing methods, for example by rendering personalized image data and/or text into bitmap images and the textured portion 56 is then applied to the surface 62 by the laser using a raster scan method or by a line vector scan method. The texture portion is achieved by small depressions formed in the outermost surface of the card 50. If there is an underlying laser marked portion 60, the texturing should be such that the underlying laser marked portion remains visually unobstructed by the textured portion 56. By changing the pulse energy and/or time of the laser pulse for each dot/pixel of the applied textured portion 56, the depth and size of the each dot/pixel is varied, resulting in a dot/pixel leveling affect in the textured portion 56. In one non-limiting example, the texturing in the textured portion can be applied at about 200 dpi, with a maximum depth into the surface of about 100 μm. In some embodiments, some or all of the textured portion 56 can be visible to the naked eye in all viewing orientations of the card 50. In another embodiment, some or all of the textured portion 56 can be covert, i.e. not visible to the naked eye when viewing the card 50 directly, but becomes visible when the card 50 is rotated in such a way that an external light source reflects off the surface 62 of the card 50. Depending on the size and depth of the texture applied, the reflected light varies presenting a visible and variable dimension to the printed portion 58. The textured portion 56 may also be tactile. In other embodiments, some or all of the textured portion may remain covert, i.e. not visible to the naked eye, to enhance surface adhesion of the printing.

The optional printed portion 58 can be formed by any suitable printing technology, including printing technologies known in the card personalization art including, but not limited to, drop-on-demand (DOD), dye diffusion thermal transfer, retransfer printing, and the like. The printed portion 58 can be color (YMCK) printing or monochromatic printing. In the case of DOD printing to form the printed portion 58, taking place after the textured portion 56 is formed, the texture formed in the surface 62 allows for the ink to adhere below the level of the top surface 62 which makes tampering with the printed portion 58 more difficult. In addition, the ink flow into the texture can minimize or eliminate the amount that the ink is raised on the surface 62 of the card 50. In addition, the textured portion 56 can reduce or eliminate the need for surface treatment prior to DOD printing. Creating the textured portion 56 modifies the surface tension of the surface 62 similarly to pre-treatment such as plasma treatment. In addition, poor ink flow during DOD printing is less obvious due to the texturing of the textured portion 56, and the applied DOD ink is likely to adhere better to a textured surface due to increased surface area.

The optional laser marked portion 60 can be formed using an infrared laser or other suitable laser known in the art for laser marking of plastic cards. The laser creates an image(s) by interacting with material forming the card and turning the material a different color, for example causing the material to darken. The laser marked portion 60 is formed within the thickness of the card 50, i.e. underneath the surface 62, and resides under or underlies the textured portion 56 and the printed portion 58. An example of a suitable laser that can be used to form the laser marked portion 60 can be found in the MX6100 Card Personalization System available from Entrust Corporation of Shakopee, Minn. When the underlying portion is formed by other than laser marking, the underlying portion can be formed by printing such as by a pre-printed subsurface lithography printed portion.

Turning to FIGS. 3-7, partial cross-sectional views of different embodiments of the plastic card 50 taken through the security feature 52 are illustrated. In FIGS. 3-7, the dimensions of the various features such as the card layers, the texturing of the textured portion 56, the printed ink 58, and the optional laser marked portion 60 are greatly exaggerated to help explain the concepts. In FIGS. 3-7, similar features are referenced using the same reference numerals.

Figure 3:
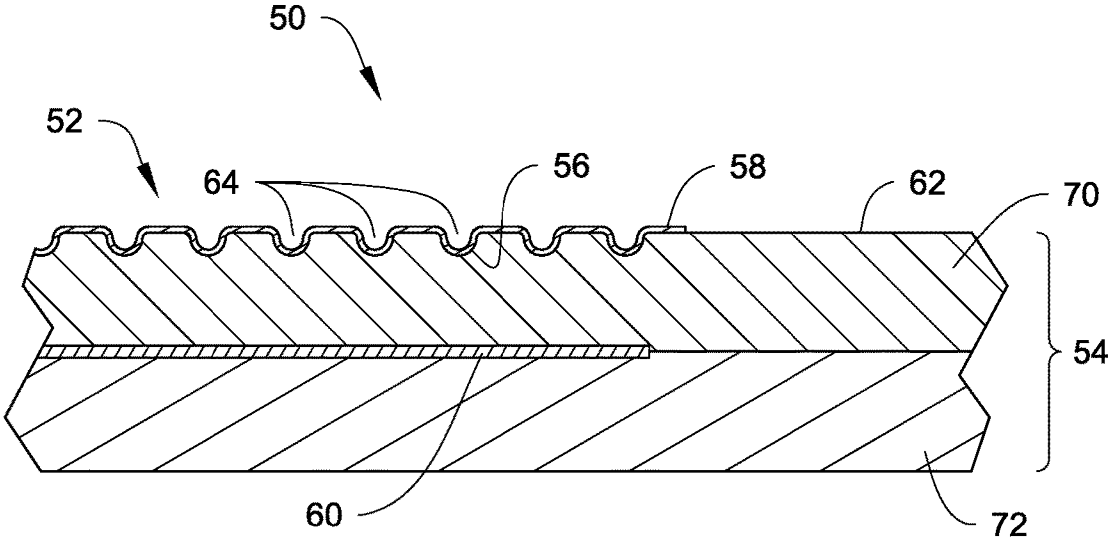
FIG. 3 is a partial cross-sectional view of a plastic identification card taken through one embodiment of a security feature described herein.

In FIG. 3, the card 50 is illustrated as including two layers 70, 72 of the card body 54 although a larger number of layers can be present. The layer 70 includes the surface 62. The texturing of the textured portion 56 is formed in the surface 62. In this example, the texturing is depicted as depressions 64 formed in the surface 62 and extending beneath the surface 62. The depressions 64 can be ordered, uniformly spaced from one another, extend in the same direction if they have a longitudinal extent, and can each be of generally equal, uniform size (e.g. depth and width) and shape as depicted. In other embodiments, the depressions 64 can be random and/or unequally spaced and/or extend in different directions and/or can vary in size and/or shape. The depressions 64 can take many forms and shapes that create a texture on the surface including, but limited to, grooves, channels, dots, small divots, and the like and combinations thereof.

In creating the security feature 52 in FIG. 3, the textured portion 56 is created in the surface 62. Thereafter, the printed portion 58 is applied, for example by DOD printing, retransfer printing, or dye diffusion thermal transfer printing. The printing is depicted as extending into the depressions 64 so that some of the printing resides below the surface 62. As a result, the texturing is also present in the printed portion 58. Since part of the printed image resides below the surface 62 in the depressions 64, tampering with the printed portion 58 is much more difficult than if the printed image 58 resided entirely on the surface 62. In addition, the ink in the depressions 64 will not wear like the ink on the surface. As a result, the printed portion 58 that resides in the depressions 64 will be visible longer because that ink is not exposed to surface wear. Optionally, a transparent or translucent coating (depicted in FIG. 4) can be applied over the printed portion 58 and over the textured portion 56.

Optionally, the laser marked portion 60 can also be used and reside below the textured portion 56, for example in or on the layer 72. The laser marked portion 60 can be used with just the textured portion 56 (i.e. without the printed portion 58 being present), or used together with the printed portion 58. The laser marked portion 60 can be formed before or after the textured portion 56 is generated, and can be formed before or after the printed portion 58 is formed if used with the printed portion 58. When the textured portion 56, the printed portion 58 and the laser marked portion 60 are present and congruent with each other, the security feature 52 is much more difficult to tamper with or manipulate.

FIG. 3 also depicts the textured portion 56, the printed portion 58, and the laser marked portion 60 (if present) as having roughly the same lateral extent so that they substantially identically overlap, or are substantially identically in congruence with, one another.

Figure 4:
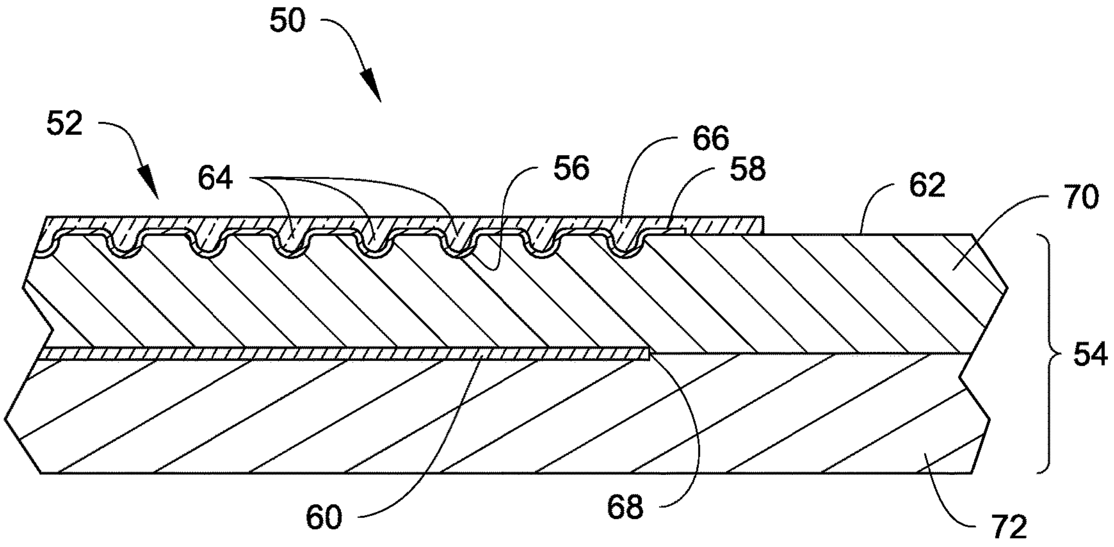
FIG. 4 is another partial cross-sectional view of a plastic identification card taken through another embodiment of a security feature described herein.

FIG. 4 illustrates a partial cross-sectional view of another embodiment of the plastic card 50 taken through the security feature 52. In FIG. 4, the textured portion 56 is created in the surface 62. Thereafter, the printed portion 58 is applied, for example by DOD printing, retransfer printing, or dye diffusion thermal transfer printing. The printing is depicted as extending into the depressions 64 so that some of the printing resides below the surface 62. Since part of the printed image resides below the surface 62 in the depressions 64, tampering with the printed portion 58 is much more difficult than if the printed image 58 resided entirely on the surface 62. In addition, a transparent or translucent coating 66 is depicted as being applied over the printed portion 58 and over the textured portion 56. The texturing formed by the textured portion 56 is not formed in the coating 66 so that in this embodiment the textured portion 56 is not tactile.

Optionally, the laser marked portion 60 can also be used and reside below the textured portion 56, for example in or on the layer 72. The laser marked portion 60 can be used with just the textured portion 56 (i.e. without the printed portion 58 being present), or used together with the printed portion 58. The laser marked portion 60 can be formed before or after the textured portion 56 is generated, and can be formed before or after the printed portion 58 is formed if used with the printed portion 58. In addition, FIG. 4 depicts that the textured portion 56, the printed portion 58, and the laser marked portion 60 can have different lateral sizes. For example, the lateral sizes of the textured portion 56 and the printed portion 58 are shown as being less than the lateral size of the optional laser marked portion 60 so that a lateral edge 68 of the laser marked portion 60 extends beyond lateral edges of the textured portion 56 and the printed portion 58.

Figure 5:
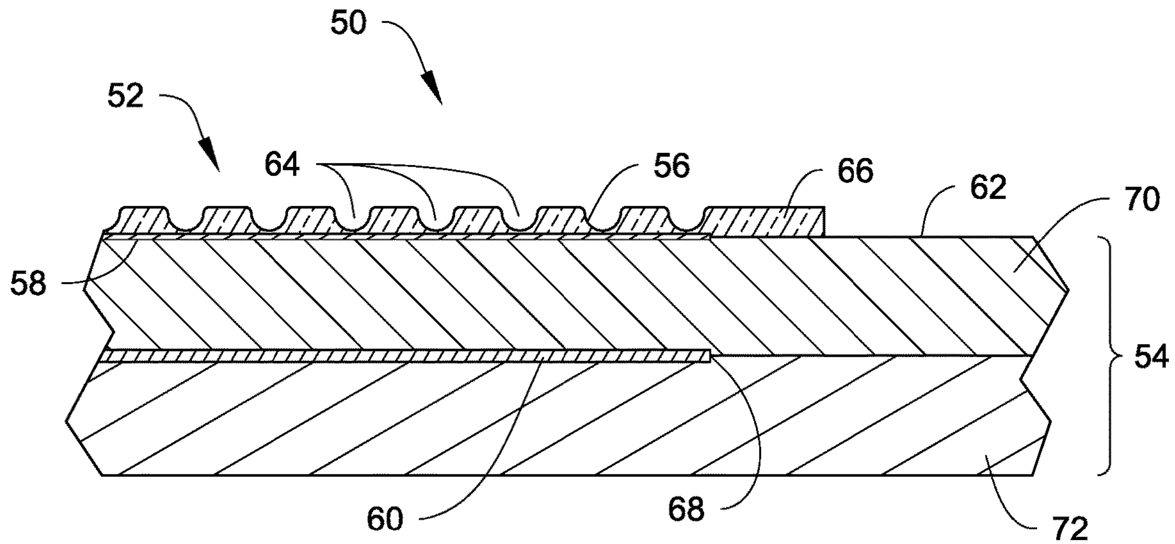
FIG. 5 is another partial cross-sectional view of a plastic identification card taken through another embodiment of a security feature described herein.

FIG. 5 illustrates a partial cross-sectional view of another embodiment of the plastic card 50 taken through the security feature 52. In FIG. 5, the textured portion 56 is created in the coating layer 66 which is disposed on top of the printed portion 58. In this embodiment, the printed portion 58 is formed on the surface 62, followed by application of the coating 66, and thereafter followed by creation of the textured portion 56. In this embodiment, the textured portion 56 is formed on top of or over the printed portion 58. Since the coating layer 66 is present, the coating layer can be considered to form an outermost surface of the card 50 whereby the textured portion 56 is formed in the outermost surface of the card 50. The coating layer 66 is optional, and the textured portion 56 could instead be formed directly in the printed portion 58 which is applied first followed by forming the textured portion 56 in the printed portion 58. The printed portion 58 can be created by DOD printing, retransfer printing, or dye diffusion thermal transfer printing.

The optional laser marked portion 60 is also depicted in FIG. 5 residing below the textured portion 56 and the printed portion 58. The laser marked portion 60 can be used with just the textured portion 56 (i.e. without the printed portion 58 being present), or used together with the printed portion 58. The laser marked portion 60 can be formed before or after the textured portion 56 is generated, and can be formed before or after the printed portion 58 is formed if used with the printed portion 58. In addition, FIG. 5 depicts that the textured portion 56, the printed portion 58, and the laser marked portion 60 can have different lateral sizes. For example, the lateral sizes of the textured portion 56 and the printed portion 58 are shown as being greater than the lateral size of the optional laser marked portion 60 so that the lateral edges of the textured portion 56 and the printed portion 58 extend beyond the lateral edge 68 of the laser marked portion 60.

Figure 6:
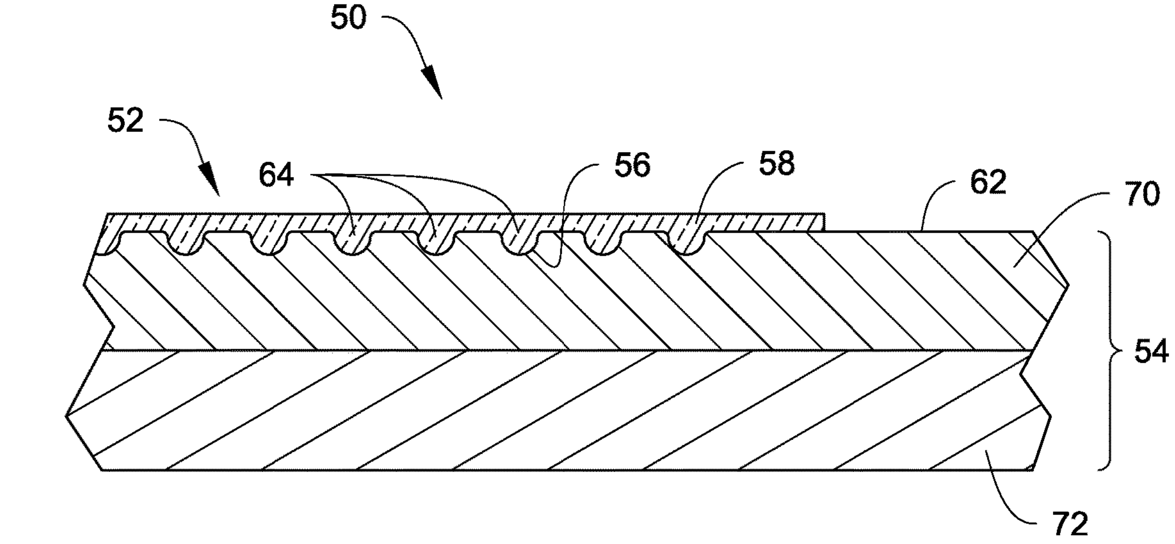
FIG. 6 is another partial cross-sectional view of a plastic identification card taken through another embodiment of a security feature described herein.

FIG. 6 illustrates a partial cross-sectional view of another embodiment of the plastic card 50 taken through the security feature 52. This embodiment depicts the textured portion 56 together with the printed portion 58. In FIG. 6, the textured portion 56 is created in the surface 62. Thereafter, the printed portion 58 is applied, for example by DOD printing, retransfer printing, or dye diffusion thermal transfer printing. The printing is depicted as extending into the depressions 64 so that some of the printing resides below the surface 62. Since part of the printed image resides below the surface 62 in the depressions 64, tampering with the printed portion 58 is much more difficult than if the printed image 58 resided entirely on the surface 62.

Figure 7:
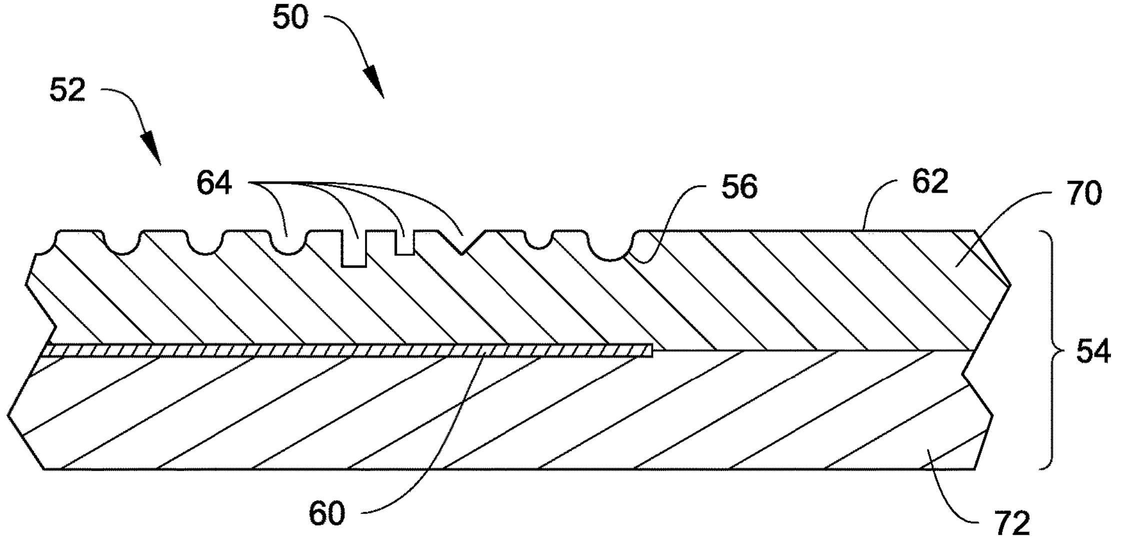
FIG. 7 is another partial cross-sectional view of a plastic identification card taken through another embodiment of a security feature described herein.

FIG. 7 illustrates a partial cross-sectional view of another embodiment of the plastic card 50 taken through the security feature 52. This embodiment depicts the textured portion 56 together with the laser marked portion 60. In this embodiment, the textured portion 56 is used as a secondary feature that can be registered to and coordinated with the laser marked portion 60 to provide evidence of image tampering and/or manipulation. FIG. 7 also depicts the depressions 64 as having varying shapes, sizes, widths, spacing from one another, and the like. Such a variation in the depressions 64 can be used with any of the embodiments of FIGS. 3-6.

The cards 50 can be processed in any type of card processing system that is suitable for creating the security features 52 described herein. For example, the card processing system can be configured as a large volume batch production card processing system (or central issuance processing system) that processes cards in high volumes, for example on the order of high hundreds or thousands per hour, employ multiple processing stations or modules to process multiple cards at the same time to reduce the overall per card processing time. Examples of such large volume card processing machines include the MX and MPR family of central issuance processing machines available from Entrust Corporation of Shakopee, Minn. Other examples of central issuance processing machines are disclosed in U.S. Pat. Nos. 4,825,054, 5,266,781, 6,783,067, and 6,902,107, all of which are incorporated herein by reference in their entirety. Of the card processing system can be configured as a desktop card processing system that is typically designed for relatively smaller scale, individual card personalization in relatively small volumes, for example measured in tens or low hundreds per hour, often times with a single card being processed at any one time. These card processing machines are often termed desktop processing machines because they have a relatively small footprint intended to permit the processing machine to reside on a desktop. Many examples of desktop processing machines are known, such as the SD or CD family of desktop card printers available from Entrust Corporation of Shakopee, Minn. Other examples of desktop processing machines are disclosed in U.S. Pat. Nos. 7,434,728 and 7,398,972, each of which is incorporated herein by reference in its entirety.

When the document is a passport, the passport can be processed in any type of passport processing system that is suitable for creating the security features 52 described herein. An example of a passport processing system is a PB6500 Passport Issuance System available from Entrust Corporation of Shakopee, Minn.

Figure 8:
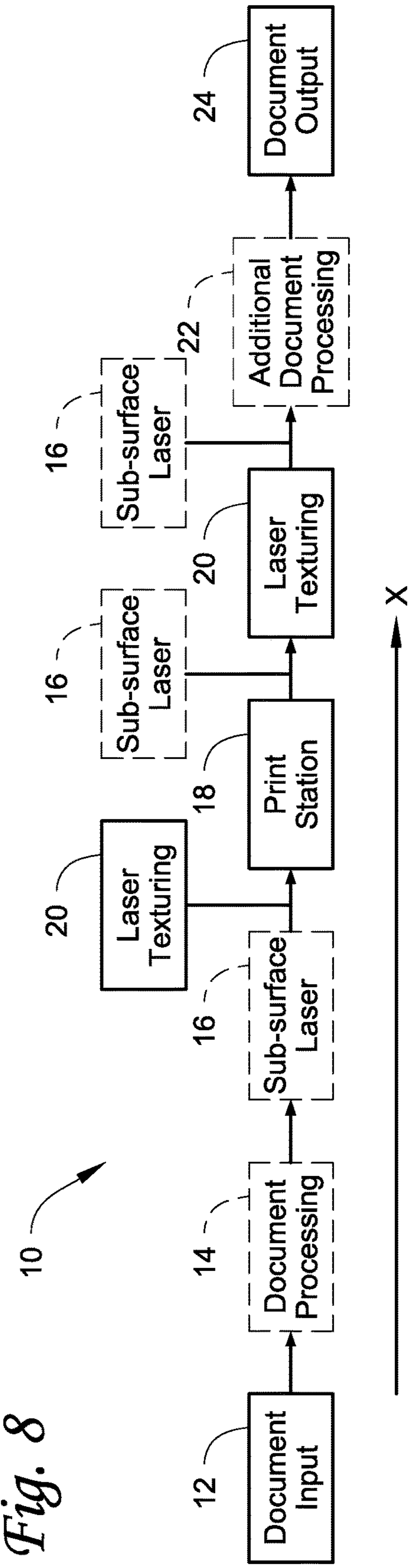
FIG. 8 is a schematic depiction of an embodiment of an identification document processing system described herein that is configured to create the security features as described herein.

FIG. 8 is a schematic depiction of one embodiment of a large volume batch production document processing system 10 that can be used to create the security features 52 described herein on cards or passports. The document processing system 10 is configured to process multiple documents at the same time, with the documents being processed in sequence, with the documents proceeding generally along the document transport direction/transport path X. The system 10 in FIG. 8 can include a document input 12, one or more optional document processing stations 14 downstream from the document input 12, an optional sub-surface laser station 16, a print station 18, a laser texturing station 20, one or more optional additional document processing stations 22, and a document output 24. The system 10 can include additional stations as would be understood by persons of ordinary skill in the art.

The document input 12 can be configured to hold a plurality of plastic cards or passports waiting to be processed and that mechanically feeds the documents one by one into the system 30 using a suitable document feeder. The documents are initially introduced into the one or more optional document processing stations 14 if they are present in the system. The stations 14, if present, can include a chip testing device that is configured to perform contact or contactless testing of an integrated circuit chip on each document to test the functionality of the chip. Testing the functionality of the chip can include reading data from and/or writing data to the chip. The construction and operation of chip testing devices in document processing systems is well known in the art. The stations 14 can also include a magnetic stripe read/write testing device (when the documents are cards) that is configured to read data from and/or write data to a magnetic stripe on each card (if the cards include a magnetic stripe). The construction and operation of magnetic stripe read/write testing devices in document processing systems is well known in the art.

The optional sub-surface laser station 16, if present in the system 10, is configured to generate the laser marked portion 60. The laser used in the laser station 16 can be an infrared laser that creates an image(s) by interacting with material forming the document and turning the material a different color, for example causing the material to darken. The laser station 16 can be located upstream or downstream of the print station 18 and/or the laser texturing station 20.

The print station 18 can be any type of printing mechanism that is suitable for generating the printed portion 58 described herein. For example, the print station can be configured to perform DOD printing, retransfer printing, or dye diffusion thermal transfer printing. In some embodiments, for example in the case of DOD printing using ultraviolet (UV) curable ink, a plasma treatment station and/or a UV-curing station can be provided that work with the print station 18.

The laser texturing station 20 is configured to generate the textured portion 56 of the security feature 52. The laser used in the laser texturing station 20 can be any laser that is suitable for creating the textured portion 56. For example, the laser can be a $CO_2$ laser. An example of a suitable $CO_2$ laser that can be used is the laser used in the Laser Perforation Module used in the PB6500 Passport Issuance System available from Entrust Corporation of Shakopee, Minn. The laser texturing station 20 can be located in the system 10 upstream of the print station 18 or downstream of the print station 18.

If the coating 66 is used, a coating station can be suitably located in the system 10, for example between the print station 18 and the laser texturing station 20 or downstream of both the print station 18 and the laser texturing station 20.

The one or more additional document processing stations 22 can be stations that are configured to perform any type of additional document processing. Examples of the additional document processing stations 22 include, but are not limited to, an embossing station having an embosser configured to emboss characters on the documents, an indent station having an indenter configured to indent one or more characters on the documents, a lamination station with a laminator configured to apply one or more laminates to the documents, a topcoat station with a topcoat applicator configured to apply a topcoat to one or more of the surfaces of the documents, a security station with a security feature applicator configured to apply one or more additional security features to one or more of the surfaces of the documents, and one or more document reorienting mechanisms/flippers configured to rotate or flip a document 180 degrees for processing on both sides of the documents.

The document output 24 can be configured to hold a plurality of documents after they have been processed. In this configuration, the document output 24 is often termed a document output hopper. The construction and operation of output hoppers is well known in the art.

Figure 9:
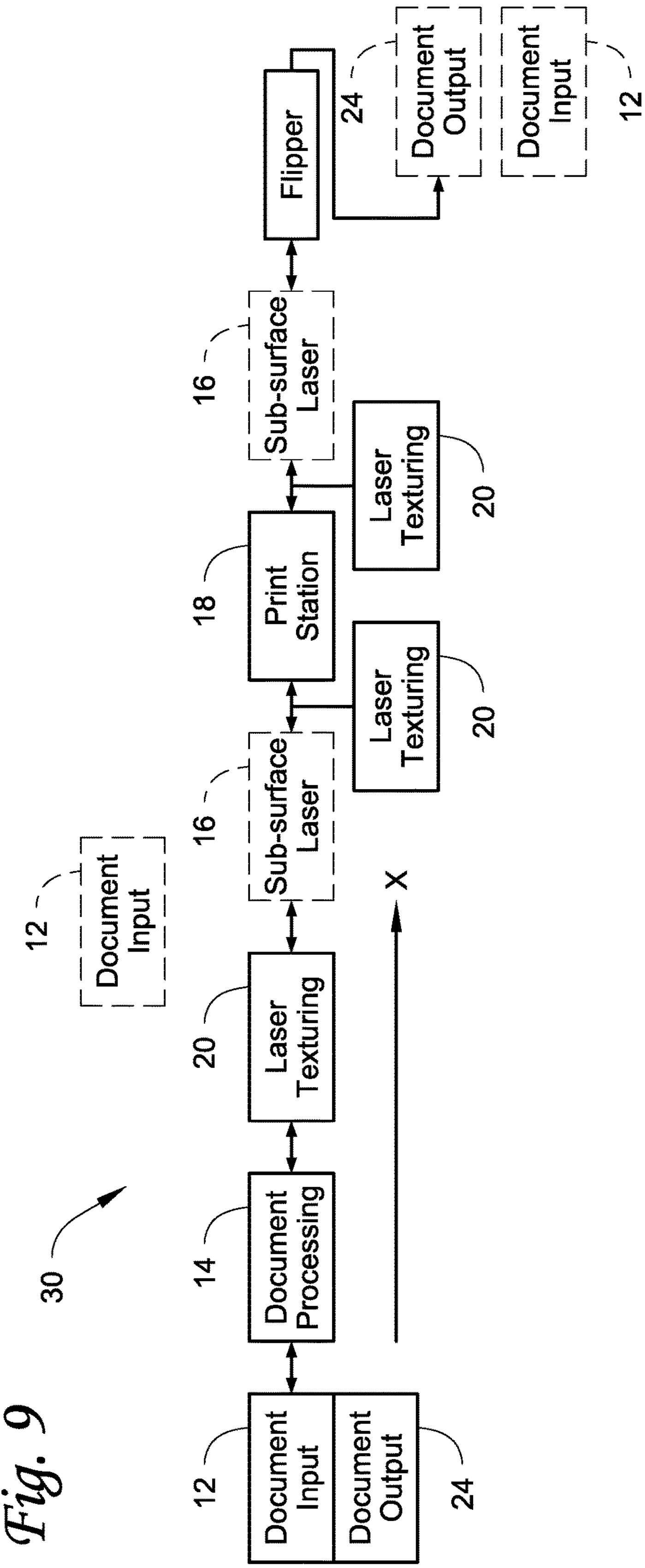
FIG. 9 is a schematic depiction of another embodiment of an identification document processing system described herein that is configured to create the security features as described herein.

FIG. 9 is a schematic depiction of an embodiment of a desktop document processing system 30 that is typically designed for relatively smaller scale, individual card or passport personalization in relatively small volumes, for example measured in tens or low hundreds per hour, often times with a single document being processed at any one time. In FIG. 9, elements that are similar in construction or functionality to elements in the system 10 in FIG. 8 are referred to using the same reference numerals. In FIG. 9, the system 30 is illustrated as including the document input 12 and the document output 24 at one end of the system 50. In the type of system depicted in FIG. 3, the document input 12 and/or the document output 24 can be provided at other locations in the system 30. For example, in one embodiment, the document input 12 can be located at a position higher up in the system, for example at the top of the system above the transport path X between the ends of the system 30. In another embodiment as depicted in dashed lines in FIG. 9, the document input 12 and the document output 24 can be located at the opposite end of the system 30.

The one or more optional document processing stations 14, the optional sub-surface laser station 16, the print station 18, and the laser texturing station 20 can be arranged relative to one another in the manner indicated in FIG. 9.

In the systems 10, 30 in FIGS. 8 and 9, the documents can be transported throughout the systems 10, 30 and moved along the document transport path X by one or more suitable mechanical document transport mechanisms (not shown). Mechanical document transport mechanism(s) for transporting cards and passports in document processing equipment of the type described herein are well known in the art. Examples of mechanical document transport mechanisms that could be used are known in the art and include, but are not limited to, transport rollers, transport belts (with tabs and/or without tabs), vacuum transport mechanisms, transport carriages, and the like and combinations thereof. Transport mechanisms for plastic cards are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of document transport mechanisms that could be used, as well as the construction and operation of such document transport mechanisms.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An identification document, comprising:

an identification document substrate having a security feature, the security feature including a laser textured surface of the identification document substrate formed by depressions that extend into an outer surface of the identification document and a printed feature that is formed above or beneath the laser textured surface; the laser textured surface and the printed feature at least partially overlap one another; and the laser textured surface is visible to a naked eye.

2. The identification document of claim 1, wherein the identification document is a plastic card or a page of a passport.

3. The identification document of claim 1, wherein the security feature is personalization data of an intended holder of the identification document, and the laser textured surface and the printed feature each form at least a portion of the personalization data.

4. The identification document of claim 3, wherein the personalization data is an image of the intended holder of the identification document.

5. The identification document of claim 1, wherein the printed feature is formed beneath the laser textured surface.

6. The identification document of claim 1, wherein the laser textured surface and the printed feature are in congruence with one another and combine to form the security feature.

7. The identification document of claim 6, further comprising an underlying feature below the laser textured surface and below the printed feature, and the underlying feature is in congruence with the laser textured surface and the printed feature and combines with the laser textured surface and the printed feature to form the security feature.

8. An identification document, comprising:

an identification document substrate having a security feature, the security feature including a laser textured surface of the identification document substrate formed by depressions that extend into an outer surface of the identification document and a printed feature that is formed above or beneath the laser textured surface; the laser textured surface and the printed feature at least partially overlap one another; and the laser textured surface is visible to a naked eye;

the printed feature is formed above the laser textured surface, and at least a portion of the printed feature extends into the depressions whereby the portion of the printed feature extends below the outer surface of the identification document.

9. The identification document of claim 8, wherein the laser textured surface is tactile.

10. A plastic card or passport page, comprising:

a substrate having a security feature formed by personalization data of an intended holder of the plastic card or the passport page;

the security feature including a plurality of depressions that are formed in an outer surface of the plastic card or the passport page, the plurality of depressions are visible to a naked eye; and at least one of the following:

a printed feature that is formed above or beneath the depressions; the depressions and the printed feature each form at least a portion of the personalization data; the depressions and the printed feature identically overlap one another so that the depressions and the printed feature are in congruence with one another and combine to form the security feature;

a laser marked feature that is formed beneath the depressions; the depressions and the laser marked feature each form at least a portion of the personalization data; the depressions and the laser marked feature identically overlap one another so that the depressions and the laser marked feature are in congruence with one another and combine to form the security feature.

11. The plastic card or passport page of claim 10, wherein the personalization data is an image of the intended holder of the plastic card or a passport with the passport page.

12. The plastic card or passport page of claim 10, wherein the security feature comprises the printed feature, and wherein the printed feature is formed beneath the depressions.

13. The plastic card or passport page of claim 10, wherein the security feature comprises the laser marked feature.

14. The plastic card or passport page of claim 10, wherein the security feature comprises the printed feature and the laser marked feature.

15. A plastic card or passport page, comprising:

a substrate having a security feature formed by personalization data of an intended holder of the plastic card or the passport page;

the security feature including a plurality of depressions that are formed in an outer surface of the plastic card or the passport page, the plurality of depressions are visible to a naked eye; and at least one of the following:

a printed feature that is formed above or beneath the depressions; the depressions and the printed feature each form at least a portion of the personalization data; the depressions and the printed feature are in congruence with one another and combine to form the security feature;

a laser marked feature that is formed beneath the depressions; the depressions and the laser marked feature each form at least a portion of the personalization data; the depressions and the laser marked feature are in congruence with one another and combine to form the security feature;

the security feature comprises the printed feature, and the printed feature is formed above the depressions, and at least a portion of the printed feature extends into the depressions whereby the portion of the printed feature extends below the outer surface of the plastic card or passport page.

16. The plastic card or passport page of claim 15, wherein the depressions are tactile.

17. A method of producing a security feature on a plastic card or passport page, where the security feature is formed by personalization data of an intended holder of the plastic card or the passport page, comprising:

forming a plurality of depressions in an outer surface of the plastic card or the passport page using a laser, wherein the depressions are formed so as to be visible to a naked eye; and forming one or more of the following:

a) a printed feature on the plastic card or the passport page that is located above or beneath the depressions, wherein the depressions and the printed feature each form at least a portion of the personalization data;

forming the depressions and the printed feature so that the depressions and the printed feature identically overlap one another so that the depressions and the printed feature are in congruence with one another and combine to form the security feature;

b) a laser marked feature on the plastic card or the passport page that is located above or beneath the depressions, wherein the depressions and the laser marked feature each form at least a portion of the personalization data;

forming the depressions and the laser marked feature so that the depressions and the laser marked feature identically overlap one another so that the depressions and the laser marked feature are in congruence with one another and combine to form the security feature.

18. The method of claim 17, comprising a) and b).

19. The method of claim 17, comprising forming the printed feature beneath the depressions.

20. The method of claim 17, comprising forming the depressions so that the depressions are tactile.

21. The method of claim 17, comprising forming b).

22. The method of claim 17, wherein the personalization data is an image of the intended holder of the plastic card or a passport with the passport page.

23. A method of producing a security feature on a plastic card or passport page, where the security feature is formed by personalization data of an intended holder of the plastic card or the passport page, comprising:

forming a plurality of depressions in an outer surface of the plastic card or the passport page using a laser, wherein the depressions are formed so as to be visible to a naked eye; and forming one or more of the following:

a) a printed feature on the plastic card or the passport page that is located above or beneath the depressions, wherein the depressions and the printed feature each form at least a portion of the personalization data;

forming the depressions and the printed feature so that the depressions and the printed feature are in congruence with one another and combine to form the security feature;

b) a laser marked feature on the plastic card or the passport page that is located above or beneath the depressions, wherein the depressions and the laser marked feature each form at least a portion of the personalization data;

forming the depressions and the laser marked feature so that the depressions and the laser marked feature are in congruence with one another and combine to form the security feature;

forming the printed feature above the depressions, and at least a portion of the printed feature extends into the depressions whereby the portion of the printed feature extends below the outer surface of the plastic card or passport page.

24. An identification card, comprising:

a card substrate having a security feature in a form of an image of an intended holder of the identification card; the security feature including a laser textured portion, a color printed portion formed with ink, and a laser marked portion; at least the color printed portion overlays the laser textured portion and some of the ink of the color printed portion extends into depressions of the laser textured portion; the laser textured portion, the color printed portion and the laser marked portion overlap one another; the color printed portion and the laser marked portion are in congruence with one another to form the image; and the laser textured portion is visible to a naked eye.

* * * * *